United States Patent [19]
Orbea et al.

[11] Patent Number: 5,996,432
[45] Date of Patent: Dec. 7, 1999

[54] TORQUE VARIATOR DEVICE

[76] Inventors: César Raúl López Orbea; Elsa Dora Luján Orbea de López, both of San Martin 686, 7°piso Of. "72" - 1004, Buenos Aires, Argentina

[21] Appl. No.: 09/044,143

[22] Filed: Mar. 19, 1998

[30] Foreign Application Priority Data

Oct. 31, 1997 [AR] Argentina .................... P 97 01 05063

[51] Int. Cl.$^6$ .................................................. G05G 7/04
[52] U.S. Cl. ................................................ 74/63; 74/518
[58] Field of Search .............................. 74/63, 516, 518

[56] References Cited

U.S. PATENT DOCUMENTS 4,712,438  12/1987  Nawojski et al. ..................... 74/63

FOREIGN PATENT DOCUMENTS

821807  4/1981  Russian Federation ................ 74/63

Primary Examiner—Allan D. Herrmann
Attorney, Agent, or Firm—Pendorf & Cutliff

[57] ABSTRACT

The present invention is a torque variator device of the type applicable to transmission shafts of a vehicle. The device is interconnected between its conductor and conducted ends. The device includes a conducting piece that conforms a header end that is run through by a plurality of radial throats that constitute the radial displacement guides of perspective articulate arms; a radially expandable set of articulated arms with articulation ends that are proximal to the connection base of the conducing piece; a conducted piece coupled to the conducted end of the transmission shaft and that, coaxially and proximally opposed to the conductor piece; a positional variator provided with radial displacement for the articulated arms; and a control means of the positional variator.

10 Claims, 6 Drawing Sheets

TORQUE VARIATOR DEVICE

BACKGROUND OF THE INVENTION

The present invention consists in a torque variator device which, applied to transmission shafts, allows varying the torque applied when said shafts are functioning; applied to differential gears of vehicles allows to vary the torque of a palier respecting the other palier.

There are different moments and circumstances in which the transmission shaft of a mechanism requires a greater torque than the used normally. Such is the case in the starting step of some mechanisms in which forces liable to overcome the tendency of the set at rest are required. This tendency becomes evident more acutely during the starting step, but, up to certain extent, it can become evident later during other steps of the normal regime. In these cases, the highest torque is tried to be achieved, delivering the least amount of energy possible.

These needs may be satisfied by means of the present toque variator device which is disposed interconnected between the conducting and conducted ends of the application shaft. It includes a conducting piece with radial throat that are used as guides to articulated arm components of a set radially expandable that, in its position of maximum expansion, allows to obtain the maximum torque.

In order to vary the torque, the device counts with a positional variator that, provided with control means, realizes the expansion or contraction of the expandable set. Thus, the torque is varied, which, through the conducted piece is delivered to the conducted end of the application shaft.

A typical case of application is in the paliers (bearings) of vehicles. As is known, these paliers are projected as from the output of the differential gear. In the curves of the road, the external wheel must travel a longer arch, the latter has the function of allowing the same to turn faster than the internal wheel. The drawback is that, in traditional differential gears, the external wheel that turns faster decreases its power allowing problems concerning stability and grip, particularly in difficult or badly maintained roads.

In order to limit this problem one turns to device such as the so called Torsen system which is based in a plurality of helicoidal screws disposed in the satellite pinions. Nevertheless, this system has its limitations as its wearing out gives place to blockage or skidding.

The so called viscous couplings are also employed, which are composed by an alignment of friction discs which are affixed one to another, being immersed in oil. In this case the wearing out or oil leaking produced to same abovementioned unwanted effects.

Instead, with the present torque variator device there is a solution for all these drawbacks, as, not only the mentioned wearing out is prevented, but also the torque of a palier may be varied with respect to the torque of the other, varying it according to the requirements of each wheel, particularly in the curves.

Thus, by means of the radial expansion of the expandable set, the articulated arms are shifted towards the periphery of the conducted piece, obtaining a greater toque over the conducted end of the wheel which is external in the curve. At the same time, by means of the contraction of the expandable set of the other palier, the torque of the internal wheel is decreased in the curve, thus obtaining an optimum functioning of the vehicle even on difficult roads.

On the other hand, the presence of control means as a pneumatic device allows to carry out the control an the operation of the device by means of any compatible commanding device, such as an electronic circuit drive.

BRIEF DESCRIPTION OF THE DRAWINGS

The object of the invention has been illustrated for better clarity and understanding of the same. It is illustrated with various figures in which its has been represented in one of its preferred embodiments, all this as an illustrative, not limiting example:

FIG. 1a which complements FIG. 1b, shows part of a longitudinal section of the present torque variator device applied to paliers of a vehicle. One of the outputs of the differential gear can be seen. The radially expandable set is disposed with its articulated arms in the position of maximum expansion, by means of which the maximum torque in the conducted end of the palier is obtained. It corresponds to the case where the wheel, at a curve, must turn at a greater speed.

In the different figures the same reference numbers indicate same or corresponding parts, the sets of various elements being indicated with letters.

List of Main References (a) differential gear
(b) conducting piece
(c) positional variator
(d) conducted piece
(e) radially expandable set of arms (11)
(f) Pneumatic control device [control means].
(1) inlet driving shaft
(1') pinion of the driving shaft (1)
(2) casing
(3) ring gear
(3') satellite pinions
(4) conductor end of the transmission shaft or palier (4') planetary pinions
(5) conducted end of the transmission shaft or palier
(6) connection base or coupling of the conducting piece
(7) header end of the conducting piece (b)
(8) radial throats
(8') convex annular edge of the header end (7)
(9) internal working cavities for the connecting rods (17)
(10) air supply of the pneumatic device (f)
(11) articulated arms of the conducting piece (b)
(11') free ends of the articulated arms (11)
(12) articulations of the arms (11) in the connection base (6)
(13) dish-shaped body of the conducted piece (d)
(14) shifting guides in the body (13)
(14') annular concavity
(15) central passage of the body (13)
(16) support body of the positional variator (c)
(16') articulations of the connecting rods (17) in the support body (16).
(17) set of connecting rods [radial shifting means]
(17') command articulations between connecting rods (17) and the articulated arms (11)
(18) central cavity conformed between pieces (b) and (d)
(19) driving rod of the positional variator (c)
(20) lateral walls of the gyrating chamber (23)
(20') inlet ducts
(20") outlet ducts
(21) hermetizing annular joints
(22) hermetized static pre-chamber
(23) pneumatic gyrating chamber
(24) pneumatic cylinder
(25) driving piston of the positional variator (c)
(26) cam ring
(27) wheels displaceable by the ring (26)
(28) inlet valves
(29) outlet valves
(30) superior inlet valves of the cylinder (24)
(30') inferior outlet valves of the cylinder (24)
(31) superior outlet valves of the cylinder (24)

MAIN OBJECT

To the specified ends, the torque variator device, of the type applicable to transmission shafts such as the palier of a vehicle, interconnected between its conductor (4) and conducted (5) ends; is characterized because it includes:

(a) a conducting piece (b) that conforms a header end (7) that, run through by a plurality of radial throats (8) that constitute the radial displacement guides of respective articulated arms (11), has a greater diameter that the mentioned conductor end (4) to which said conductor piece (b) is coupled by means of a connection base (6);

(b) a radially expandable set (e) of articulated arms (11) is articulation ends (12) being proximal to the connection base (6) of said conducting piece (b) while the free ends (11') of said arms (11) project externally to said header end (7), thus constituting levers of the third genre its power being given by the lateral walls of said radial throats (8) and its resistance being in a conducted piece (d);

(c) a conducted piece (d) coupled to the conducted end (5) of said transmission shaft and that, coaxially and proximally opposed to said conductor piece (b), conforms radial displacement guides (14) for the free ends (11') of said articulated arms (11);

(d) a positional variator (c) provided with radial displacement means (17) of said articulated arms (11), with said arms (11) said means (17) are connected by means of respective command articulations (17');

(e) control means (f) of the positional variator (c).

DESCRIPTION OF THE PREFERRED EMBODIMENTS

The present torque variator device, interconnectable between the conductor (4) and conducted (5) ends of a transmission shaft, in general terms, includes a conducting piece (b) with radial throats (8) that serve as guides of articulated arms (11) that compose a radially expandable set (e). This radially expandable set (e) is commanded by a positional variator (c) that, provided with control means (f), has sets of connecting rods (17) for the radial displacement of the articulated arms (11). The free ends (11') of these arms (11) have displacement guides (14) in a conducted piece (d) proximally opposite to the conducting piece (b). [see FIGS. 1a and 1b].

In general, the present variator device is applicable to transmission shafts, although in the present way of embodiment its application to the outlet of the differential gear (a) of a vehicle is described.

More particularly, the inlet driving shaft (1) to the differential gear (a) has a pinion (11') that, inside the casing (2), engages in the ring gear (3) of said differential gear (a). The ring gear (3) is connected to the satellite pinions (3') and the latter (3') engage the planetary pinions (4'). As from these planetary (4'), the respective conductor ends (4) of the transmission shafts or paliers project, towards opposite sides. [see FIG. 1a].

Between each conductor end (4) and its conducted end (5) there is interconnected a variator deivice, in such a way that a vehicle includes two identical devcies—one in each palier—, due to which the description of one of them is enough.

At the outlet of the differential gear (a), the conductor end (4) has coupled the connection base (6) of a conducting piece (b). This conducting piece (b) has a conformation which is similar to that of a toadstool, being narrower in the connection base (6) and wider at its header end (7). Precisely, this header end (7), which has a greater diameter than the conductor end (4) of the palier, has running through the same four radial throats (8) that constitute radial displacement guides destined to respective articulated arms (11) [see FIGS. 3 and 3a].

Figure 2:
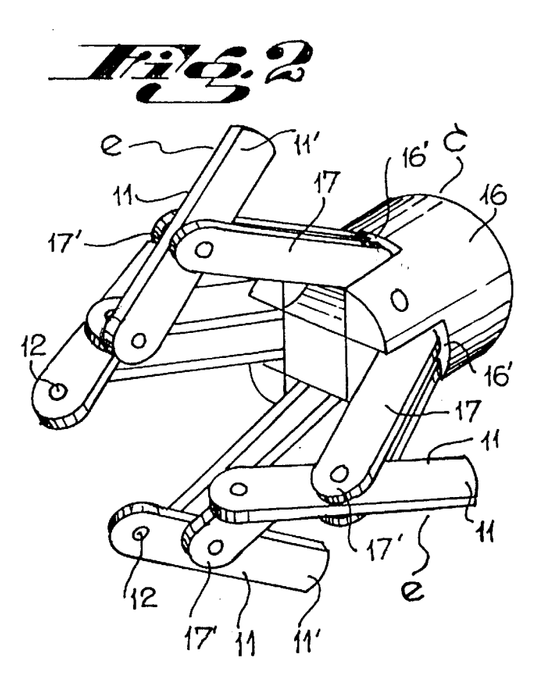
FIG. 2 is a view in perspective of the positional variator with is corresponding set s of connecting rods. To the effects of illustration, the articulated arms that compose the radially expandable set have been included.

Within said conductor piece (b) there is mounted a radially expandable set (e) of articulated arms (11) its articulated ends (12) being adjacent to the connection base (6). The free ends (11') of said ends (11) project externally to the header end (7), constituting levers of the third genre its power being given by the lateral walls of said radial throats (8) and its resistance being in the displacement guides (14) of the conducted piece (b). [see FIG. 2].

Figure 1A:
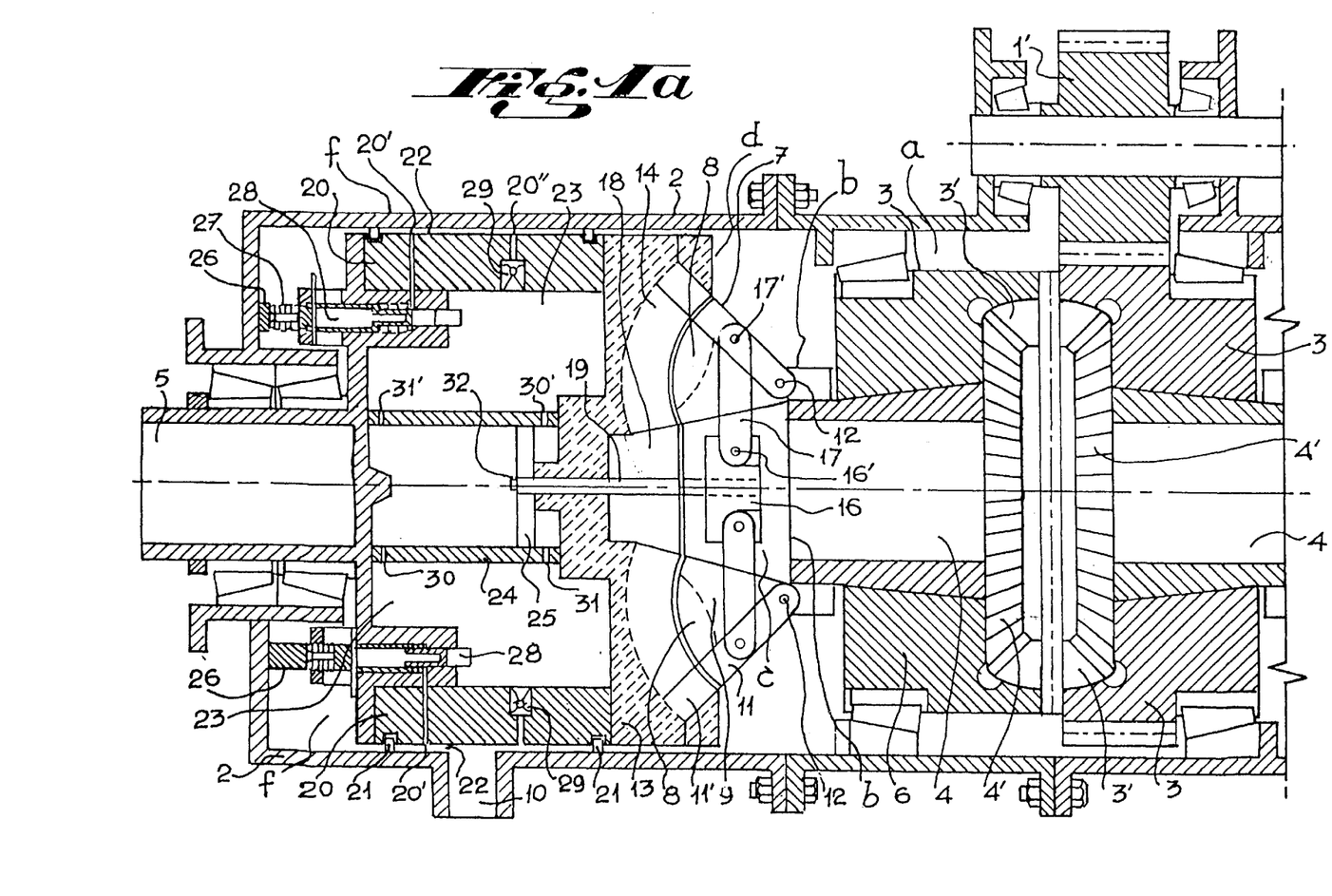
Figure 1B:
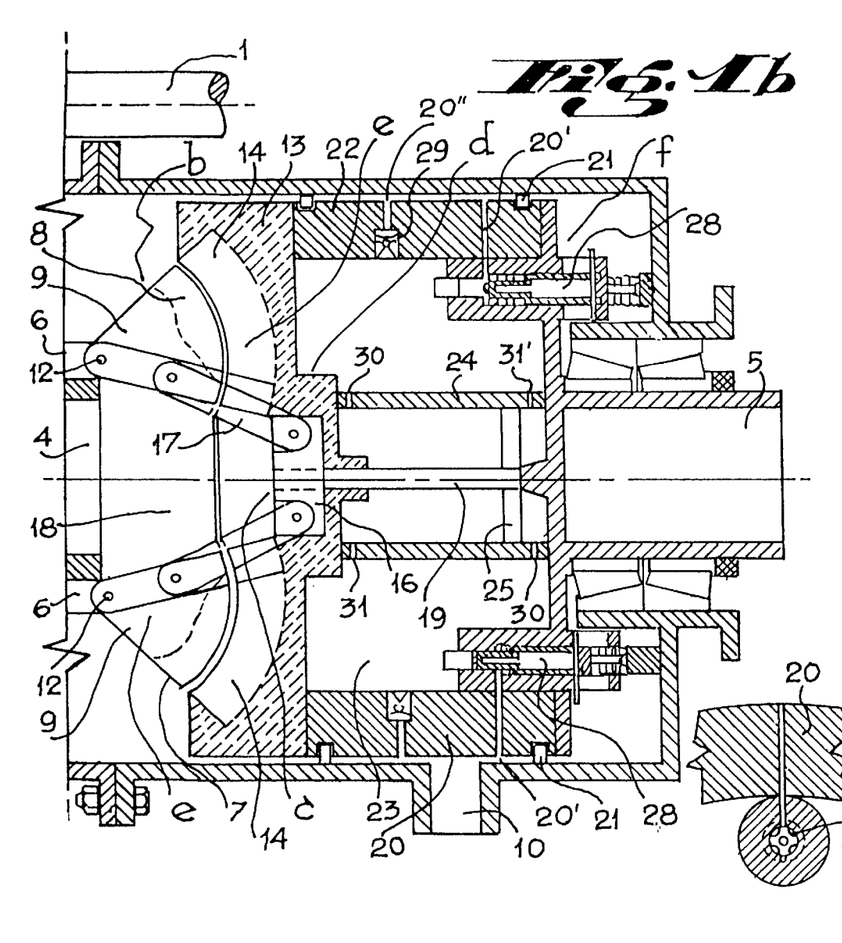
FIG. 1b, being complementary to FIG. 1a, completes the longitudinal section of said FIG. 1a. The other output of the differential gear is seen, but in this case the radially expandable set is contracted, in such a way that the conducted end of this palier the minimum torque is delivered. It corresponds to the case where the wheel, at a curve, must turn at lesser speed.
Figure 3:
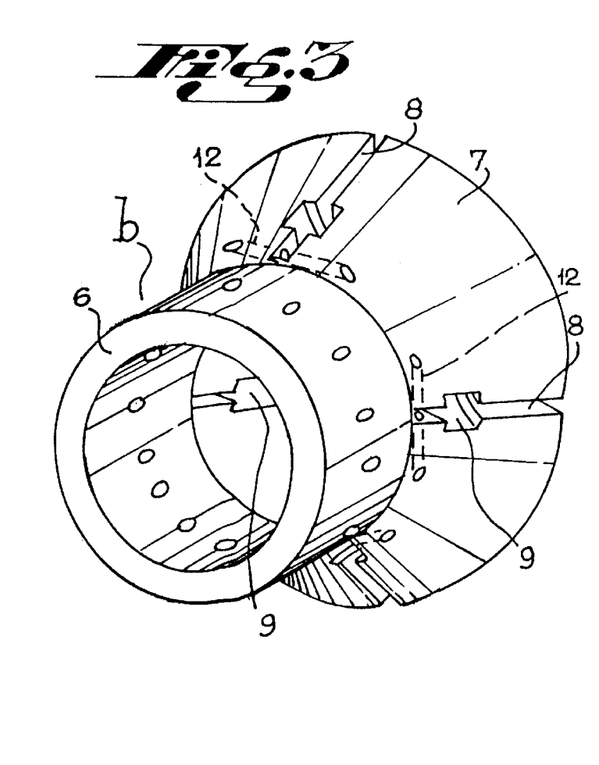
FIG. 3 is a posterior view in perspective of the conducting piece in which the conformation of its connection base can be seen.
Figure 3A:
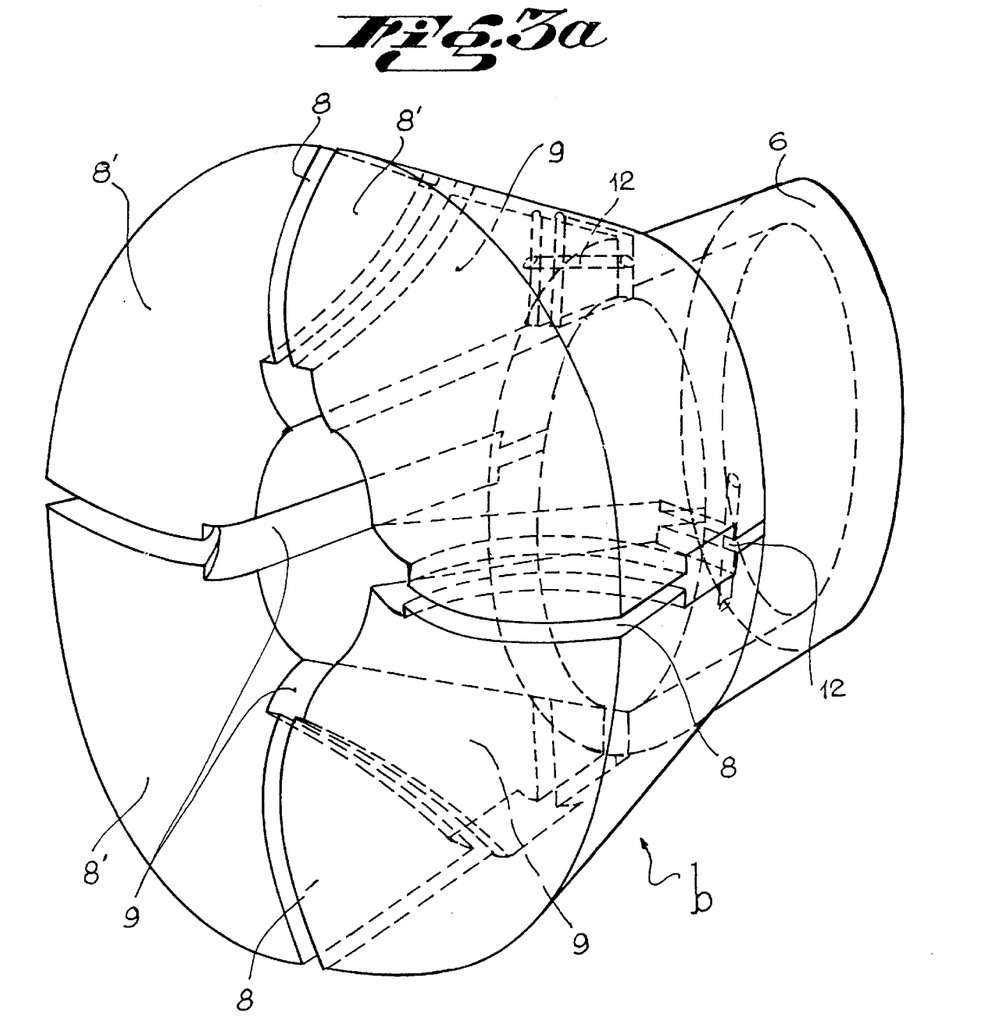
FIG. 3a is an anterior view in perspective of the conducting piece in which the conformation of its header end can be seen. In the same the radial throats and the annular convex edge can be seen. The discontinuous lines give an idea of the internal constitution of the piece.

Together with this, the radial throats (8) of the header end (7) end externally in a convex annular edge (8') defined by a generating arch its radius ending in the articulations (12) of the articulated arms (11). [see FIGS. 3, 1a and 1b].

Figure 4A:
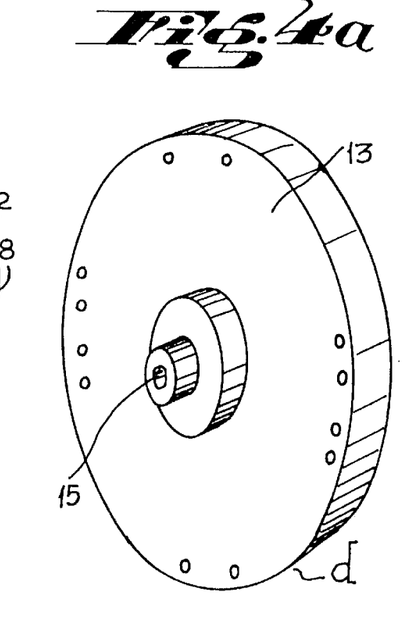
FIG. 4a is a posterior view in perspective that allows to observe the central passage of the conducted piece by which the driving rod of the positional variator passes.
Figure 4B:
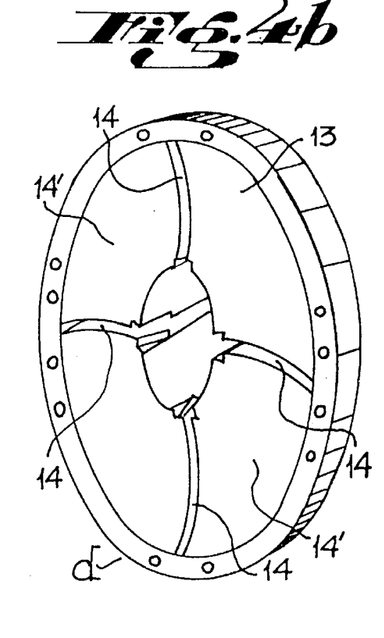
FIG. 4b is an anterior view in perspective of the conducted piece, in which its annular concavity cut through by the shifting guides for the ends of the articulated arms can be observed.

Furthermore, the conducted piece (d) is coupled to the conducted end (5) of the palier. It is a dish-shaped piece (d) disposed coaxially and proximally opposed to the conducting piece(b). The main face of this conducted piece (d) conforms an annular concavity (14') radially run through by radial displacement guides (14) destined to the ends (11') of the respective articulated arms (11). Thus, the conformation that the annular concavity (14') confers to the conducted piece (d), corresponds with the convex annular edge (8') of the conducting piece (b), to which it is proximally opposed. [see FIGS. 4a and 4b].

Between both pieces (b)(d) proximally opposed there is conformed a central cavity (18) destined to the axial displacement of the positional variator (c). Said latter (c) includes a support body (16) which is coaxial with said conducting (b) and conducted (d) pieces, among which is interposed. [see FIGS. 1a and 1b].

This positional variator (c) has radial displacement means (17) of the articulated arms (11). They are sets of connecting rods (17) that, articulatorily projected (16') from the support body (16) of the positional variator (c), are connected by means of command articulations (17') to the intermediate part of the articulated arms (11). These connections (16') (17') are made in such a way that, the sets of connecting rods (17) as well as the articulated arms (11), are able of angular displacement within respective radial planes, its intersection coinciding with the virtual rotation axis of the device. [see FIGS. 2, 1a and 1b].

In correspondence with there connection, in the internal part of the conducting piece (b), there are working cavities (9) for the sets of connecting rods (17). [see FIGS. 3, 3a, 1a and 1b].

On the other hand, the positional variator (c) has control means (f) to which it joins by means of a driving rod (19). These control means (f) are constituted by a control pneumatic device (f) composed by a circuit of supply of compressed air.

This pneumatic supply is connected to a hermetized static pre-chamber (2) delimited by the casing (2) and by hermetizing annular joints (21). Inside this static chamber (22) there are four gyrating chambers (23), which are solidary with the conducted piece (d) and closed by lateral walls (20) that are traversed by inlet ducts (20') and outlet ducts (20"). These ducts (20')(20") lead to respective inlet (28) and outlet (29) valves the control the pneumatic supply of the gyrating chambers (23). The inlet valves (28) are driven by means of cam rings (26) of variable height over which wheels (27) of said valves (28) shift. [see FIGS. 1a and 1b]

The gyrating chambers (23), have an annular conformation in such a way the they embrace a cylinder (24) provide with inferior and superior inlet (30)(31) and outlet (30')(31') valves. Within the cylinder (24) there is a piston (25) with a rod (19) that, going through a central passage (8) (15) of the conducted piece (d), is joined to the positional variator (c) as a driving means.

The set works as follows:

When the inlet driving shaft (1) gyrates, the pinion (I') of the same moves the ring gear (3) and said (3) to the satellite pinion (3') which, at the same time, moves the planetary pinion (4'). The latter (4') moves the conductor end (4) of the palier, and therefore, makes the conductor piece (b) that said conductor end (4) has coupled, to gyrate. [see FIG. 1a]

Furthermore, the conducting piece (b) moves the conducted piece (d) by means of the radially expandable set (e) of articulated arm (11). This is due to the fact that the free ends (11') of said articulated arms (11) project beyond the header end (7) of the conducting piece (b), being inserted in the displacement guides (14) of the conducted piece (d). [see FIGS. 1a and 1b].

On the other hand, by means of any compatible driving device, such as an electronic circuit, the control pneumatic device (f) is driven to the effects of controlling the inlet (28) and outlet (29) valves that control the passage of compressed air between the static pre-chamber (22) and the gyrating chamber (23).

As from the gyrating chamber (23) the inlet of air to the cylinder (24) is controlled by means of the inlet (30)(31) and outlet (30')(31') valves that are found at both ends of said cylinder (24), so that the function efficiently, whichever the position in which the piston (25) is found. [see FIGS. 1a and 1b].

Thus, the displacements of the piston (25) within the cylinder (24) are controlled, and therefore, of the rod (19) that drives the positional variator (c).

When said positional variator (c) is displaced towards the conductor end (4) of the palier, the set of connecting rods (17) are located transversal to the virtual rotation axis of the device. This movement of the sets of connecting rods (17) produces the radial expansion of the expandable set (e) due to the fact that the articulated arms (11) are shifted towards the periphery of the conducted piece (d). In this condition a greater torque over the conducted end (5) of the palier is obtained.

If, on the contrary, the positional variator (c) is displaced towards the conducted end (5), the sets of connecting rods (17) collapse towards the virtual rotation axis. Consequently, the contraction of the expandable set (e) is produced, and, due to this, the displacement of the ends (11') of the articulated arms (11) towards the central part of the conducted piece (d). In this disposition of the set the smaller torque over the conducted end (5) of the palier is achieved. [see FIGS. 1a and 1b].

Figure 5:
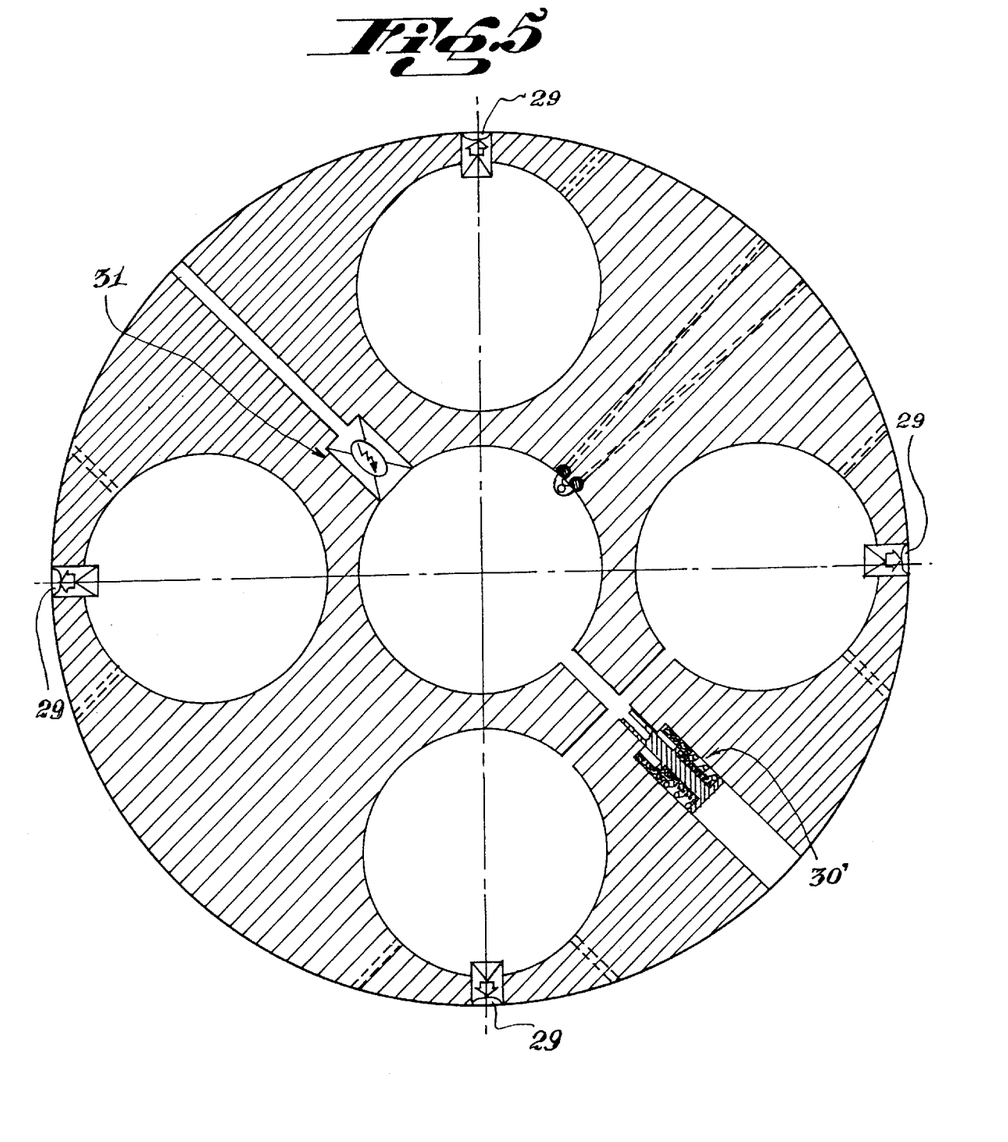
FIG. 5 is a detail in section of the system provided with the needle valves in an open position; and finally
Figure 6:
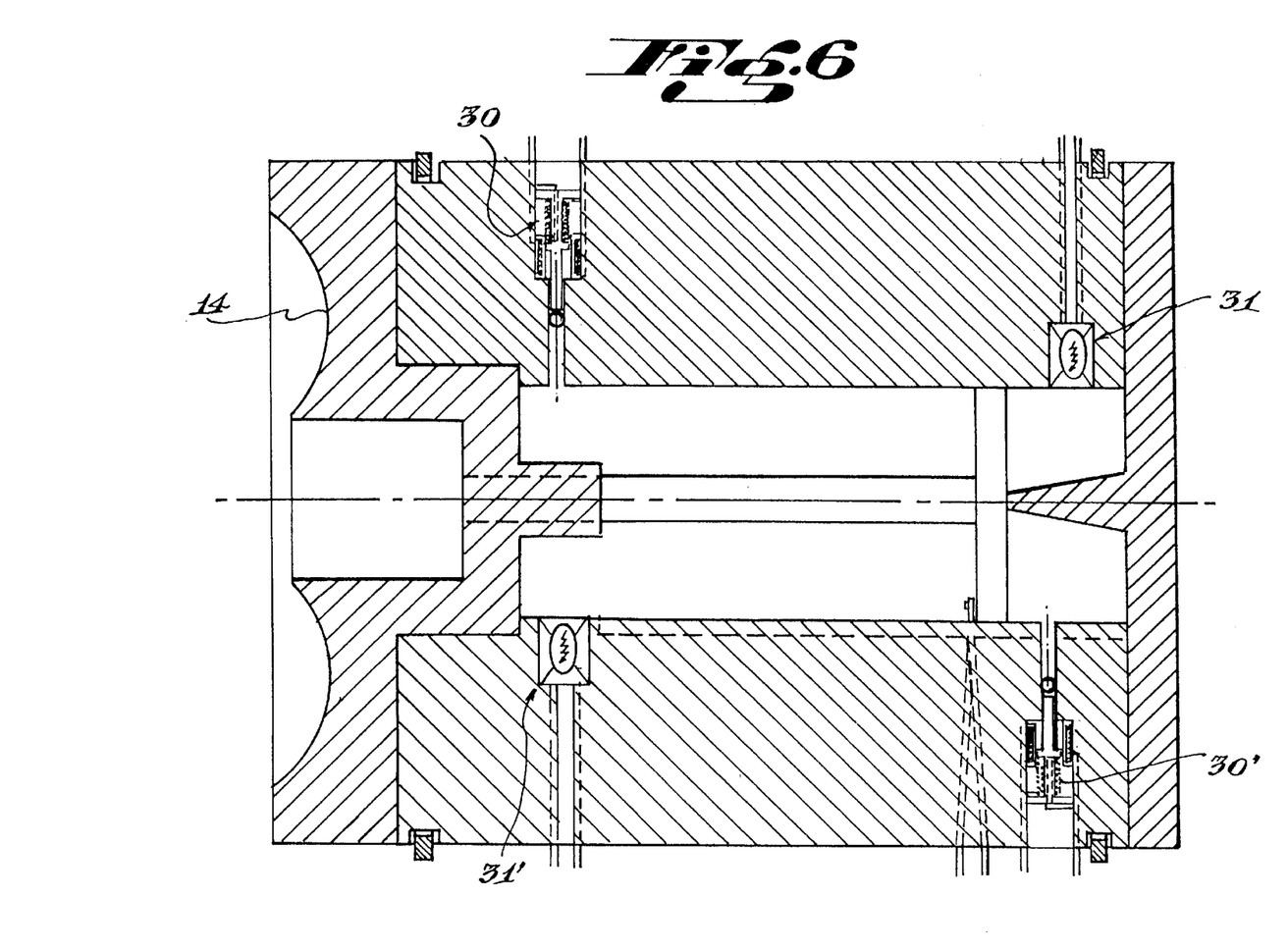
FIG. 6 is another detail of the device showing the presence of the outlet valves and its characteristics.

Concerning the functioning of the mechanism, FIGS. 5 and 6, while the piston must not move, the needle valves (30) and (30') remain open, the small pistons driven by the cam ring, pump air in a continuous way; the pressure in the reservoirs—and, therefore, at both sides of the piston—increases, and the piston is firmly retained in its position.

If the pressure increases excessively, overcomes the resistance of the outlet valve or valves, which then evacuate air, maintaining it within tolerable limits.

If within the cylinder the piston must move towards the conductor end, the PCU (pressure control unit) drives the draining electrovalve (31'), and the air is evacuated to the annular chamber, and the pressure towards that side of the piston decreases, so the same moves towards the conductor end.

To decrease the pressure in a quicker way, and prevent an excessive loss of compressed air from the reservoirs, the PCU drives simultaneously the draining valve (31') and the needle valve (30), which then blocks the pass of compressed air from the reservoirs to the cylinder.

When the piston arrives to the desired position, the PCU interrupts the signal to the valves (30) and (31'); so, the draining valve (31') closes, and the needle valve (30) opens, allowing again the access of compressed air to the cylinder, thus balancing the pressure at both sides of the piston, making it define firmly its new position.

If the piston must move towards the conducted side, the sequence is exactly the same, changing the draining valve (31') for the valve (31), and the inlet valve (30) for the valve (30').

The presence of two torque variator devices each provided of independent control means (f), in the respective paliers, allows to apply different torque to each wheel in cases as a curve, for example. Complementary, it has been foreseen the inclusion of position sensors 32 at the position of the driving means (25)(19) of the positional variator (c) to achieve a better control of the device.

Indubitably, when the present invention is carried out, modifications concerning details in construction and shape may be introduced, without this implying parting from the fundamental principles that are clearly exposed in the claim clauses that follow hereinafter:

Having thus described and determined the nature of the present invention, and how it can be carried out, the same is declared to claim as an exclusive right and property:

1. Torque variator device, of the type applicable to transmission shafts having the palier of a vehicle, interconnected between its conductor and conducted ends; is characterized because it includes:

(a) a conducting piece that conforms a header end that, run through by a plurality of radial throats that constitute the radial displacement guides of respective articulated arms, has a greater diameter than the said conductor end to which said conducting piece is coupled by means of a connection base;

(b) a radially expandable set of articulated arms is articulation ends being proximal to the connection base of said conducting piece while the free ends of said arms project externally to said header end, thus constituting levers of the third genre its power being given by the lateral walls of said radial throats and its resistance being in a conducted piece;

(c) a conducted piece being coupled to the conducted end of said transmission shaft and that, coaxially and proximally opposed to said conducted piece, conforms radial displacement guides for the free ends of said articulated arms;

(d) a positional variator provided with radial displacement means of said articulated arms, with said arms said means are connected by means of respective command articulations;

(e) control means of the positional variator.

2. Torque variator device according to claim 1 wherein the positional variator includes a support body which is coaxial with the conductor and conducted pieces, among which pieces said support body is interposed being capable of axial displacement.

3. Torque variator device according to claim 1 wherein the displacement means of the articulated arms consist in sets of connecting rods which, projected in an articulable way from the support body of the positional variator, are connected by means of driving articulations to the respective articulated arms.

4. Torque variator device according to claim 1 wherein the sets of connecting rods as well as the articulated arms are capable of angular displacement inside the respective radial planes its intersection coinciding with the virtual rotation axis of the device.

5. Torque variator device according to claims 1 wherein the positional variator has as a driving means formed by the joining of a piston with a rod that composes the pneumatic control device.

6. Torque variator device according to claim 1 wherein between the conducting and conducted pieces which are found proximally confronted, there is formed a central cavity of axial displacement of the positional variator.

7. Torque variator device, of the type applicable to transmission shafts having the palier of a vehicle, interconnected between its conductor and conducted ends; is characterized because it includes:

a conducting piece that conforms a header end that, run through by a plurality of radial throats that constitute the radial displacement guides of respective articulated arms, has a greater diameter than the said conductor end to which said conducting piece is coupled by means of a connection base;

a radially expandable set of articulated arms is articulation ends being proximal to the connection base of said conducting piece while the free ends of said arms project externally to said header end, thus constituting levers of the third genre its power being given by the lateral walls of said radial throats and its resistance being in a conducted piece;

a conducted piece being coupled to the conducted end of said transmission shaft and that, coaxially and proximally opposed to said conducted piece, conforms radial displacement guides for the free ends of said articulated arms;

a positional variator provided with radial displacement means of said articulated arms, with said arms said means are connected by means of respective command articulations, said positional variator having a support body which is coaxial with the conductor and conducted pieces, among which pieces said support body is interposed being capable of axial displacement;

said displacement means of the articulated arms consist in sets of connecting rods which, projected in an articulable way from the support body of the positional variator and are connected by means of driving articulations to the respective articulated arms; and control means of the positional variator, said control means of the positional variator consist in a pneumatic control device composed by a compressed air supply circuit connected to a hermetized static chamber inside which there is a gyrating chamber, solidary with the conducted piece, said gyrating chamber, on one part communicating with said static pre-chamber through corresponding inlet and outlet valves, on the other part feeds a cylinder that, provided of inlet and outlet valves, disposes of a driving piston of the positional variator.

8. Torque variator device according to claim 7 wherein the conducting piece has a conformation similar to the one of a toadstool, at its header end the radial throats, on one part origin as from the working internal cavities of the respective connecting rods while, on the other part said throats end externally at a convex annular edge defined by a generating arch its radius ending in the articulations of the arms.

9. Torque variator device according to claim 7 wherein the conducted piece consist in a dish shape with the main face of the conducted piece conforming an annular concavity that, run through radially by displacing guides of the ends of the articulated arms, have a corresponding conformation with the convex annular edge of the conducting piece, to which end said concavity confronts proximally.

10. Torque variator device according to claim 7 wherein the pneumatic control device includes position sensors of the driving means of the positional variator.

* * * * *